United States Patent
Kobler et al.

(10) Patent No.: US 9,273,984 B2
(45) Date of Patent: *Mar. 1, 2016

(54) DEVICE AND METHOD FOR TRANSMITTING DATA BETWEEN A POSITION-MEASURING DEVICE AND SEQUENTIAL ELECTRONICS

(75) Inventors: Alexander Kobler, Burgkirchen (DE); Heik H. Hellmich, Kienberg (DE); Michael Walter, Polling (DE); Terukiyo Hayashi, Hachiouji (JP); Ruedi Schoppmann, Tokyo (JP); Takeshi Yamamoto, Hachiouji (JP)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 516 days.

This patent is subject to a terminal disclaimer.

(21) Appl. No.: 13/125,192

(22) PCT Filed: Sep. 9, 2009

(86) PCT No.: PCT/EP2009/061678
§ 371 (c)(1),
(2), (4) Date: Apr. 20, 2011

(87) PCT Pub. No.: WO2010/046179
PCT Pub. Date: Apr. 29, 2010

(65) Prior Publication Data
US 2011/0213586 A1    Sep. 1, 2011

(30) Foreign Application Priority Data
Oct. 24, 2008   (DE) .......................... 10 2008 053 105

(51) Int. Cl.
*G06F 15/00*    (2006.01)
*G01D 5/244*    (2006.01)

(52) U.S. Cl.
CPC ..................................... *G01D 5/244* (2013.01)

(58) Field of Classification Search
USPC .......................................................... 702/150
See application file for complete search history.

(56) References Cited

U.S. PATENT DOCUMENTS 5,687,103 A    11/1997   Hagl et al.
6,043,768 A     3/2000   Strasser et al.
(Continued)

FOREIGN PATENT DOCUMENTS

| CN | 1496476    | 5/2004 |
|----|------------|--------|
| DE | 197 01 310 | 8/1997 |
| DE | 103 44 090 | 4/2004 |
| EP | 0 660 209  | 6/1995 |

(Continued)

OTHER PUBLICATIONS

Chinese Search Report, dated May 22, 2012, issued in corresponding Chinese Patent Application No. 200980142106.2.
(Continued)

*Primary Examiner* — Tung S Lau
(74) *Attorney, Agent, or Firm* — Kenyon & Kenyon LLP

(57) ABSTRACT

In a device and a method for transmitting data between a position-measuring device and sequential electronics via a data-transmission channel, the position-measuring device includes an interface unit and a processing unit, the interface unit being connected first of all to the data-transmission channel, and secondly, to the processing unit for the purpose of an internal data exchange with the aid of a request channel and a response channel. The interface unit includes a command interpreter by which, using conversion rules, commands which arrive via the data-transmission channel are convertible into internal requests and are able to be fed via the request channel to the processing unit, and response data which arrives from the processing unit via the response channel is convertible into output data. The interface unit further includes a rules memory for storing the conversion rules, which is at least partially modifiable.

15 Claims, 2 Drawing Sheets

(56) References Cited

U.S. PATENT DOCUMENTS

| | | | |
|---|---|---|---|
| 6,124,588 A | 9/2000 | Hagl et al. | |
| 6,742,181 B1 * | 5/2004 | Koike et al. | 719/317 |
| 7,030,368 B2 | 4/2006 | Strasser | |
| 7,333,911 B2 | 2/2008 | Hofbauer et al. | |
| 2004/0133373 A1 | 7/2004 | Braasch et al. | |
| 2005/0094475 A1 * | 5/2005 | Naoi | 365/232 |
| 2005/0273294 A1 * | 12/2005 | Hofbauer et al. | 702/150 |

FOREIGN PATENT DOCUMENTS

| | | |
|---|---|---|
| JP | 01-175608 | 7/1989 |
| JP | 06-131032 | 5/1994 |
| JP | 2000-330641 | 11/2000 |

OTHER PUBLICATIONS

International Search Report, issued in corresponding International Application No. PCT/EP2009/061678.

* cited by examiner

DEVICE AND METHOD FOR TRANSMITTING DATA BETWEEN A POSITION-MEASURING DEVICE AND SEQUENTIAL ELECTRONICS

FIELD OF THE INVENTION

The present invention relates to a device and a method for transmitting data between a position-measuring device and sequential electronics. In the case of such a device, that is, with the aid of a method described herein, it is possible to modify the interface, underlying the data transmission, in the position-measuring device.

BACKGROUND INFORMATION

Position-measuring devices which provide an absolute position value are being used increasingly in automation technology. Certain disadvantages of what are termed incremental position-measuring devices are thereby eliminated such as, for example, the necessity of carrying out a reference sequence after switching on in order to find a reference position which is used as reference point for the further position measuring by counting graduation marks.

Primarily serial data interfaces are used for transmitting the absolute position values, since they make do with only a few data-transmission lines, and nevertheless, have high data-transmission rates. Particularly advantageous are what are called synchronous serial interfaces, which have one unidirectional or bidirectional data line and one clock line. Data packets are transmitted via the data line in synchronism with a clock signal on the clock line.

European Patent No. 0 660 209 describes a synchronous serial interface having a bidirectional data line and a unidirectional clock line. In this case, a bidirectional transfer of data—from the sequential electronics to the position-measuring device and from the position-measuring device to the sequential electronics—is possible. The data is transmitted in synchronism with a clock signal on the clock line. This principle forms the basis for an interface known under the name "EnDat."

German Patent No. 197 01 310 describes a device for transmitting data between a sensing element in the form of a position-measuring system, and a processing unit. By transmitting a reference signal on one of the signal-transmission lines, via which data is transmitted between the sensing element and the processing unit, it is possible to switch the position-measuring system to various operating modes.

Due to the progressive miniaturization in electronic engineering, it is becoming possible to integrate more and more functions into position-measuring devices. Therefore, meanwhile, in addition to the position values, frequently additional information such as the speed, thus, the change in position over time, as well as status information which allows conclusions about the operating state of the position-measuring device, is generated. Microprocessors are used to control complex operational sequences or to perform complicated calculations. That is why, in addition to pure position-request commands, modern data interfaces also have further commands in order to request additional information, or in order to write to or read out memory areas in the position-measuring device.

Standardized interfaces offer the advantage that measuring devices which are equipped with such an interface may be connected directly to sequential electronics, e.g., a machine-tool control. So long as both devices observe the interface protocol underlying the interface, further adaptation is not necessary. On the other hand, it thereby becomes difficult, however, to expand the interface, for instance, in order to provide new commands, or to change existing commands in order to adapt them to special circumstances and possibly an expanded functional scope of the position-measuring devices.

SUMMARY

Example embodiments of the present invention provide a device as well as a method by which an interface integrated in a position-measuring device may be modified.

A device as well as a method are provided for transmitting data between a position-measuring device and sequential electronics via a data-transmission channel, the position-measuring device including an interface unit and a processing unit, and the interface unit being connected first of all to the data-transmission channel, and secondly, to the processing unit for the purpose of an internal data exchange with the aid of a request channel and a response channel. The interface unit includes a command interpreter by which, using conversion rules, commands that arrive via the data-transmission channel are convertible into internal requests and are able to be fed via the request channel to the processing unit, and response data which arrives from the processing unit via the response channel is convertible into output data. The interface unit further includes a rules memory for storing the conversion rules, which is at least partially modifiable as described herein.

Further advantages of example embodiments of the present invention and details pertaining thereto are derived from the following description with reference to the Figures.

DETAILED DESCRIPTION

Figure 1:
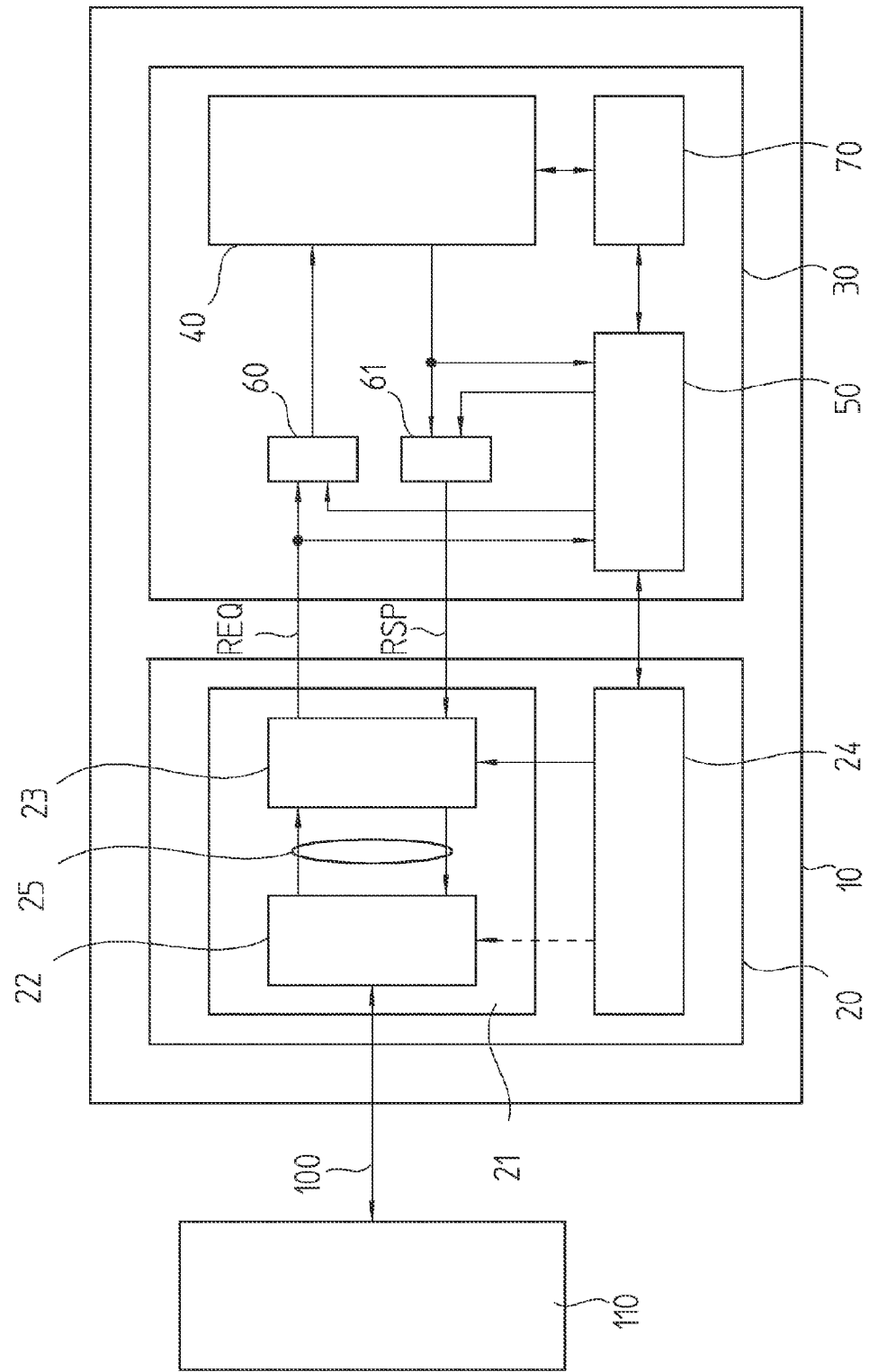
FIG. 1 shows a block diagram of a device according to an example embodiment of the present invention.

FIG. 1 shows a block diagram of a device according to an example embodiment of the present invention, having a position-measuring device 10 which is connected via a data-transmission channel 100 to sequential electronics 110, e.g., a numerical machine-tool control (NC). Position-measuring device 10 and sequential electronics 110 exchange commands and data via data-transmission channel 100. Such a system is usually a master-slave connection in which sequential electronics 110 assume the function of the master and the position-measuring device assumes the function of the slave, that is, every data transmission is initiated by sequential electronics 110, while position-measuring device 10 transmits data to sequential electronics 110 only upon request.

Data-transmission channel 100 is usually adapted for serial data transmission, that is, it includes at least one serial data connection which, if the transmission takes place differentially according to the RS-485 standard, is made up of at least one pair of lines and is terminated on both sides with suitable driver-/receiver modules. If the transmission takes place via only one bidirectionally operated, differential pair of lines, one also speaks of a 2-wire interface. On the other hand, the serial interface EnDat mentioned in the introduction uses two differential pairs of lines and is therefore called a 4-wire interface. Differential data transmission has been familiar to those skilled in the art for a long time, and is not further described here.

Data-transmission channel 100 is connected in position-measuring device 10 to an interface unit 20 which receives commands and input data from sequential electronics 110, interprets them, and passes them on via a request channel REQ to a processing unit 30. It processes commands and input data and, if output data, e.g., an absolute position value, was requested, transmits the output data via a response channel RSP to interface unit 20, which prepares the output data according to the interface protocol and transmits it to sequential electronics 110.

Processing unit 30 includes a position-measuring unit 40 as well as a CPU 50. In addition, data multiplexers 60, 61 are provided, which permit the direct exchange of data between position-measuring unit 40 and CPU 50. Processing unit 30 also includes a memory unit 70 in which, for example, the operating program of CPU 50 and data, e.g., calibration values, needed by position-measuring unit 40 are stored. Moreover, memory unit 70 may also include data about the motor or the machine on which position-measuring device 10 is operated. In this connection, one also speaks of an electronic type plate. Memory unit 70 may include both non-volatile memory areas (ROM, EEPROM) and volatile memory areas (RAM).

Both position-measuring unit 40 and CPU 50 are connected to request channel REQ and response channel RSP. This means that access to CPU 50, and especially also to memory unit 70 connected to CPU 50, is possible via data-transmission channel 100, as well. Therefore, memory locations of memory unit 70 may be read, volatile memory areas may be written, and reprogrammable memory areas may be altered by sequential electronics 110. Thus, for example, CPU 50 may be programmed or existing programs of CPU 50 may be modified in this manner.

Because CPU 50 is also able to communicate directly with position-measuring unit 40 via data multiplexers 60, 61, complex requests which require high computing expenditure are able to be processed, as well. For example, diagnostic functions may likewise be provided in this manner.

By scanning a measuring standard, position-measuring unit 40 generates position signals and converts them into digital position values which indicate the absolute position of a scanning unit relative to the measuring standard. The physical principle underlying the scanning is not relevant in this connection; for example, optical, magnetic or inductive measuring principles may be used. In addition to position values, further data may be generated in position-measuring unit 40. For instance, this includes further measured values resulting from the relative movement between the scanning unit and the measuring standard, such as speed or acceleration. However, the further data may also concern measured values which relate to the ambient conditions, e.g., temperature values. Finally, status information may also be made available as further data, e.g., in the form of status bits or a status word whose bits signal warning conditions or fault conditions. Data which is able to be requested from position-measuring unit 40 is stored in registers, for example, with a defined data-word length (e.g., 16 bits), which may be addressed individually.

The internal communication in position-measuring device 10, which takes place between interface unit 20 and processing unit 30 via request channel REQ and response channel RSP, is largely independent of the interface protocol which determines the communication between sequential electronics 110 and position-measuring device 10 via data-transmission channel 100. Preferably parallel data transmission is used here, in order to permit the fastest possible data exchange between interface unit 20 and processing unit 30 via request channel REQ and response channel RSP. The time span between the arrival of a command via data-transmission channel 100 and the sending of requested data (e.g., the position value) via data-transmission channel 100 may thereby be minimized. At this point, it should specifically be pointed out that request channel REQ and response channel RSP are drawn as separate connections merely for better understanding. In an alternative example embodiment, a bidirectional, parallel data interface may be used here, as well.

Commands, which are sent by sequential electronics 110 via data-transmission channel 100 to position-measuring device 10, are fed in interface unit 20 to a command interpreter 21. It recognizes arriving commands, converts them with the aid of conversion rules into internal requests, and forwards them via request channel REQ to processing unit 30. In the same manner, command interpreter 21, using conversion rules, converts response data which arrives at interface unit 20 from processing unit 30 via response channel RSP as a result of an internal request, into output data according to the interface protocol and transmits it via data-transmission channel 100 to sequential electronics 110. If input data also arrives with a command, after the data has been converted into an internal format, possibly also with the aid of conversion rules, it is likewise transmitted via request channel REQ to processing unit 30.

There are a number of specific digital, mostly serial data interfaces for position-measuring devices 10 on the market. Popular representatives are known under the names Hiperface or EnDat, for example. To simplify the adaptation of the electronics of a position-measuring device 10 to interfaces that differ greatly, it is advantageous to provide command interpreter 21 in modular fashion. Therefore, in example embodiments, command interpreter 21 includes a specific interface module 22 and a general interface module 23.

Specific interface module 22 converts commands and possibly input data, which arrive from sequential electronics 110 via data-transmission channel 100 made of a specific interface, e.g., EnDat, into a standardized command format, and transmits the standardized commands/input data to general interface module 23. In addition, specific interface module 22 converts output data, which arrives in a standardized output format from general interface module 23, into output data in the specific output format and transmits it to sequential electronics 110. Since the data is usually transmitted in the form of data packets via serial interfaces, the tasks of specific interface module 22 also include the extraction of commands/input data from arriving data packets, for example, as well as the supplementation of the output data by start and stop bits and additional safety-related information (CRC). Finally, in the case of bidirectional data transmission, specific interface module 22 generates the switchover signals for the corresponding driver-/receiver modules in position-measuring device 10.

General interface module 23 converts the commands/input data, arriving in the standardized command format, into internal requests according to the conversion rules described above, and converts the response data arriving from processing unit 30 into the standardized output format. Data is exchanged between specific interface module 22 and general interface module 23 via a standard interface 25, which in turn, because of the high data-transmission speed, is preferably a parallel interface. By dividing command interpreter 21 into a specific interface module 22 and a general interface module 23, position-measuring device 10 may easily be adapted to many different specific data interfaces such as EnDat, Hiperface, or others, by using various specific interface modules 22.

For example, command interpreter 21, that is, specific interface module 22 and/or general interface module 23, may be implemented as state machines, whose states are controlled according to the conversion rules. Rapid and efficient processing is thereby ensured.

Also provided in interface unit 20 is a rules memory 24 in which conversion rules are stored both for commands, which the interface protocol includes, and for the data resulting from the execution of the commands in processing unit 30 and arriving via response channel RSP. Rules memory 24 may contain conversion rules for general interface module 23 and/or for specific interface module 22.

Examples for commands are:
Request for a position-/speed-/acceleration value
Request for an additional measured value (temperature)
Request for additional information (status information)
Selection of a memory area in memory unit 70
Read access to a memory area/a memory address
Write access to a memory area/a memory address
Transmission of a reset signal The commands may concern both processing unit 30 and CPU 50, i.e., memory contents associated with these units in memory unit 70. In particular, using a special conversion rule, it is also possible to switch general interface module 23 to transparent, and thereby to permit a direct communication between CPU 50 and specific interface module 22.

According to example embodiments of the present invention, this rules memory 24 is arranged to be at least partially modifiable. The possibility is thereby provided to change the processing of commands and even to implement new commands. In the same manner, it becomes possible to convert response data, which is generated in processing unit 30 as a result of a command and is transmitted to interface unit 20, into output data whose format or contents deviate from the original definition.

An example of this:

In a standard interface protocol for safety-related applications, as a result of a position-request command which is sent by sequential electronics 110 via data-transmission channel 100 to position-measuring device 10, position-measuring device 10 transmits a first position value with 24-bit resolution, followed by a second position value with 16-bit resolution which, for safety reasons, is formed independently of the first position value. To that end, the following sequence is necessary in position-measuring device 10:

Command interpreter 21 identifies the arriving command and converts it, according to the conversion rules for this command, into requests which it passes on via request channel REQ to position-measuring unit 40. In this case, two requests are necessary for the two position values. Position-measuring unit 40 ascertains the position value requested in each case, and supplies it via response channel RSP to command interpreter 21. It combines the position values, according to the conversion rules assigned to the position-request command, to form one result data word and transmits it via data-transmission channel 100 to sequential electronics 110.

Let us now assume that in a special application, an exact monitoring of the operating temperature of position-measuring device 10 is necessary. It may be that a special command for requesting the temperature value is included in the standard interface protocol; however, the additional time requirement for the alternating requesting of position values and temperature values has a negative influence on the control response of a drive included in the application. On the other hand, let us say the first position value with 24-bit resolution is sufficient in this special application, thus, the transmission of the second position value with 16-bit resolution is not necessary. By changing the conversion rules, which are stored in rules memory 24 for the processing of the position-request command, the position-request command may now be modified such that, instead of two position values generated independently of each other, position-measuring device 10 generates one combined data word made up of the first position value with 24-bit resolution, as well as a temperature value with 16-bit resolution.

To that end, the conversion rules, which are stored in rules memory 24 for the position-request command, are changed to the effect that, in response to a position-request command, command interpreter 21 with a first request, as before, now requests the position value with 24-bit resolution from position-measuring unit 40, but then with a second request, a temperature value with 16 bits. Depending on whether the temperature value is generated by position-measuring unit 40 or by CPU 50, the second request may be directed to one of these units. According to the conversion rules for the response data, command interpreter 21 now forms one result data word, which includes the position value and the temperature value, from the values arriving via response channel RSP.

As an alternative to changing the conversion rule for the position-request command, rules memory 24 may also be expanded by a new, special position-request command.

Figure 2:
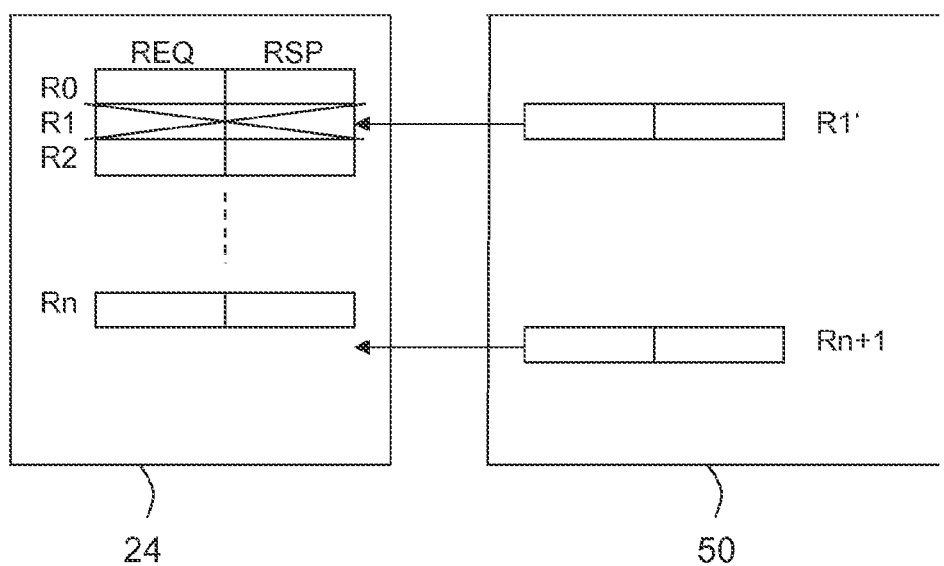
FIG. 2 shows an example for the modification of a rules memory.

The two variants are shown in FIG. 2. Conversion rules R0 through Rn for n different commands are stored in rules memory 24. Assuming that second conversion rule R1 is the conversion rule assigned to the position-request command, if it is to be altered according to the example above, it is replaced by a suitably altered second conversion rule R1'. If the original position-request command is to be retained, alternatively, conversion rules R0 through Rn may be supplemented by a new conversion rule Rn+1.

As indicated in FIG. 2, conversion rules R0 through Rn for a command may also be stored separately for the requests and responses resulting from the command. In this case, in the event of a change, it may be sufficient to replace only the portion of conversion rules R0 through Rn which is affected by the change.

Changes/additions in rules memory 24 may have powerful effects on the functioning of position-measuring device 10. Therefore, it is advantageous if rules memory 24 cannot be accessed directly via data-transmission channel 100, but rather the programming is accomplished via CPU 50, which is supplied with the relevant data. In order to always prevent basic commands such as select access, write access or read access to memory areas/addresses from being changed, conversion rules R0 through Rn which relate to these commands are advantageously not alterable, thus, for example, are stored in a read-only area of rules memory 24. Moreover, it is sensible to implement an unchangeable conversion rule for a command which restores the original state of rules memory 24. The data of the relevant conversion rules necessary for this purpose may be stored in memory unit 70, for example, and transmitted from CPU 50 to rules memory 24 in response to the corresponding command.

As a further protection, changes in rules memory 24 may be restricted to a special mode of position-measuring device 10. The switchover to such a programming mode may be accomplished either by a special interface command, or by a mechanism independent of the actual interface protocol. In this case, for example, as described in German Patent No. 197 01 310, a switchover may be initiated by a reference signal, which is transmitted from sequential electronics 110 to position-measuring device 10 on one of the signal-transmission lines of data-transmission channel 100.

Interface unit 20 may be arranged as a module in a large-scale, integrated, application-specific component (ASIC), since modifications or expansions of interface commands are then possible without having to undertake a complicated and, above all, cost-intensive redesign of the component.

What is claimed is:

1. A device for transmitting data between a position-measuring device and sequential electronics via a data-transmission channel, comprising:
    an interface unit and a processing unit included in the position-measuring device, the interface unit connected to the data-transmission channel and to the processing unit for an internal data exchange by a request channel and a response channel, the interface unit including a command interpreter adapted to convert, in accordance with conversion rules, commands that arrive via the data-transmission channel into internal requests and to feed via the request channel to the processing unit, the interface unit adapted to convert response data that arrives from the processing unit via the response channel into output data, the interface unit including a rules memory adapted to store the conversion rules, the conversion rules in the rules memory being at least partially modifiable.

2. The device according to claim 1, wherein the processing unit includes a position-measuring unit connected to the request channel and the response channel, the position-measuring unit adapted to generate position data and further data.

3. The device according to claim 1, wherein the processing unit includes a CPU connected to the request channel and the response channel.

4. The device according to claim 1, wherein the rules memory is modifiable by the sequential electronics via the data-transmission channel.

5. The device according to claim 1, wherein the command interpreter includes a specific interface module and a general interface module,
    wherein the specific interface module is adapted to convert commands that arrive via the data-transmission channel into predetermined commands of a different protocol, and to convert response data of a different protocol into specific output data for output via the data-transmission channel, and
    wherein the general interface module adapted to convert predetermined commands of a different protocol that arrive from the specific interface module into internal requests, and to convert response data that arrive via the response channel into response data of a different protocol.

6. The device according to claim 1, wherein the position-measuring device is switchable into a programming mode in order to modify the rules memory.

7. The device according to claim 3, wherein the rules memory is modifiable by the CPU.

8. A system, comprising:
    a position-measuring device;
    sequential electronics; and
    a data-transmission channel;
    wherein the position-measuring device includes an interface unit and a processing unit, the interface unit connected to the data-transmission channel and to the processing unit for an internal data exchange by a request channel and a response channel, the interface unit including a command interpreter adapted to convert, in accordance with conversion rules, commands that arrive via the data-transmission channel into internal requests and to feed via the request channel to the processing unit, the interface unit adapted to convert response data that arrives from the processing unit via the response channel into output data, the interface unit including a rules memory adapted to store the conversion rules, the conversion rules in the rules memory being at least partially modifiable.

9. A method for transmitting data between a position-measuring device and sequential electronics via a data-transmission channel, the position-measuring device including an interface unit and a processing unit, the interface unit connected to the data-transmission channel and to the processing unit for internal data exchange by a request channel and a response channel, comprising:
    storing conversional rules in a rules memory of the interface unit, the conversion rules in the rules memory being at least partially modifiable;
    converting, by a command interpreter of the interface unit, in accordance with conversion rules, commands that arrive via the data-transmission channel into internal requests;
    feeding the internal requests via the request channel to the processing unit;
    converting response data that arrives from the processing unit via the response channel into output data; and
    transmitting the output data to the sequential electronics.

10. The method according to claim 9, wherein the processing unit includes a position-measuring unit, the method further comprising:
    requesting from the position-measuring unit at least one of (a) position data and (b) further data via the request channel; and
    transmitting at least one of (a) the position data and (b) the further data as response data via the response channel to the interface unit.

11. The method according to claim 9, wherein the processing unit includes a CPU, the method further comprising:
    requesting data from the CPU via the request channel; and
    transmitting the data requested from the CPU via the response channel to the interface unit.

12. The method according to claim 9, further comprising modifying the rules memory by the sequential electronics via the data-transmission channel.

13. The method according to claim 11, further comprising modifying the rules memory by the CPU.

14. The method according to claim 9, wherein the command interpreter includes a specific interface module and a general interface module, the method further comprising:
    converting commands by the specific interface module that arrive via the data-transmission channel into predetermined commands of a different protocol, and converting response data of a different protocol into specific output data for output via the data-transmission channel; and
    converting predetermined commands of a different protocol by the general interface module that arrive from the specific interface module into internal requests, and converting response data that arrive via the response channel into response data of a different protocol.

15. The method according to claim 9, further comprising switching the position-measuring device into a programming mode in order to modify the rules memory.

* * * * *